J. P. FENNESSY.
SNAP HOOK FOR TIRE CHAINS.
APPLICATION FILED NOV. 4, 1919.
1,338,686. Patented May 4, 1920.
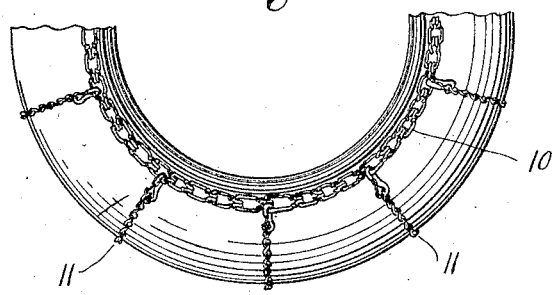
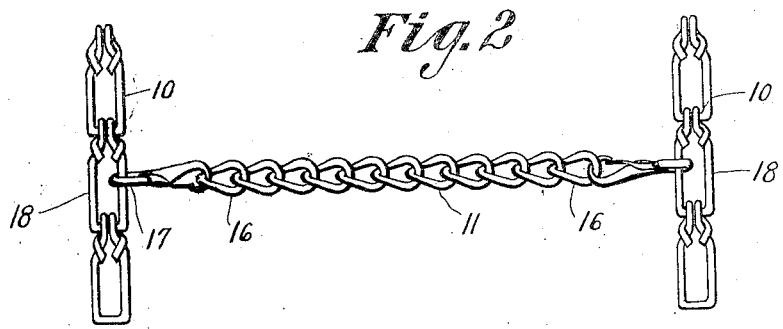
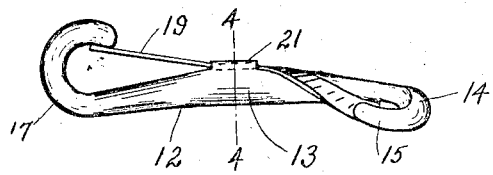
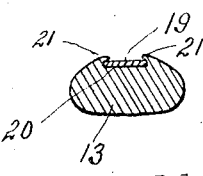
Inventor
John P. Fennessy.
By Howard E. Barlow
Attorney

UNITED STATES PATENT OFFICE.

JOHN P. FENNESSY, OF PROVIDENCE, RHODE ISLAND.

SNAP-HOOK FOR TIRE-CHAINS.

1,338,686.

Specification of Letters Patent.

Patented May 4, 1920.

Application filed November 4, 1919. Serial No. 335,574.

*To all whom it may concern:*

Be it known that I, JOHN P. FENNESSY, a citizen of the United States, and resident of the city of Providence, in the county of Providence and State of Rhode Island, have invented certain new and useful Improvements in Snap-Hooks for Tire-Chains, of which the following is a specification.

This invention relates to new and useful improvements in non-skid chains for vehicle tires; and has for its object to provide simple and effective means whereby any of the cross members of the chains may be readily removed and replaced without disturbing the others.

A further object of the invention is the provision of a specially-formed, double-ended snap-hook, one end of which is adapted to engage the end link of the cross chain laterally and downwardly to coincide in a measure to the contour or curvature of the curb link through which it passes so as to lie as flat against the side of the tire as the other links to prevent catching in the curb-stone or the like when the wheel to which it is attached is rolling in close proximity thereto.

With these and other objects in view, the invention consists of certain novel features of construction, as will be more fully described, and particularly pointed out in the appended claim.

In the accompanying drawings:

Figure 1— is a side elevation showing a portion of the tire with my improved non-skid chain applied thereto.

Fig. 2— is a detail illustrating two side chains with the cross-chain attached to said side chains by means of my improved double-ended snap-hook.

Fig. 3— is an enlarged side elevation of my improved snap-hook.

Fig. 4— is a section on line 4—4 of Fig. 3, illustrating my particular means of securing the spring or hook closing member in the body portion.

Fig. 5— is a perspective view illustrating the laterally extending and downwardly curved end portion of the hook engaging the curbed end link of the cross chain.

It is understood that the non-skidding devices now in general use consist essentially of two side chains adapted to extend around the sides of the tire, the same being connected together at intervals by cross chains which are attached thereto and which lie in contact with the tread of the tire.

It is found in practice that these cross chains are continually wearing out as they are called upon to do all of the work, therefore it is found desirable to provide simple and effective means whereby these cross chains may be readily removed when worn and replaced by fresh ones.

In order to accomplish this in a simple and effective way I have provided double-ended hook members, the hooked ends of which are disposed at substantially right angles to each other, one end engaging the side chains while the other end engages the cross chains whereby the latter may be readily removed when worn and others positioned to take their places without the necessity of removing the whole chain from the tire.

To this end I have provided the usual side chains 10 which may be formed of links of any suitable shape to lie flat against the tire and I have also provided cross chains 11 which are provided preferably with the curb type of link as such links are found to bite into ice and other slippery surfaces to prevent skidding.

The essential feature of this invention is my particular means of securing the links of the cross chains to those of the side chains which is that of providing a snap-hook 12 with a body portion 13 having a hook 14 at one end which is turned off at substantially a right angle to the axis of the body with its end 15 turned slightly downwardly so as to be adapted to pass laterally through the end link 16 of the cross chain at substantially the same angle that one of the links passes through the other, which construction has a number of advantages; first by turning the end 15 of the hook laterally and inwardly the end of the hook is effectually prevented from engaging the edge and catching upon a curb-stone or other object when rolled in close proximity thereto; then again by this construction the hook may be very readily caused to engage this end link by an inwardly hooking motion and it may also be readily disengaged from the link even without removing the whole chain from the tire when it is desired to quickly replace these cross chains while on the road.

The opposite end 17 of this hook is turned outwardly at substantially a right angle to the first described end and is adapted to be hooked from the under side outwardly into the link 18 of the side chain.

In order to prevent accidental disengagement of either end of the hook from the link which it is engaging, I have provided a spring snap wire 19 which is positioned at its middle portion in the recess 20 formed in the body of the hook, the side walls 21 of this recess being bent inwardly over the edge of the wire thus securely connecting the same to the body of the hook.

One end of this wire extends under hook 17 while the opposite end engages the under side of the hook 15 so as to prevent accidental disengagement of the links.

By the use of my improved attaching hook to the cross members of non-skid chains these cross members may be readily removed and replaced by fresh ones when worn without the necessity of removing the whole chain from the tire.

I do not wish to be restricted to the use of cross chains formed of curb links as any type of links may be employed for this purpose.

The foregoing description is directed solely toward the construction illustrated, but I desire it to be understood that I reserve the privilege of resorting to all the mechanical changes to which the device is susceptible, the invention being defined and limited only by the terms of the appended claim.

I claim:

A snap hook for tire chains comprising a body having hooks at its ends disposed at an angle to each other, said body also having a groove, and a closure spring secured within said groove and having one end twisted at an angle to engage the corresponding offset end of said hook to bring the free extremities thereof into engagement with the respective hook ends.

In testimony whereof I affix my signature.

JOHN P. FENNESSY.